United States Patent [19]

Fukunishi et al.

[11] Patent Number: 5,631,071

[45] Date of Patent: May 20, 1997

[54] INTERIOR BASE MATERIAL AND PRINTING METHOD THEREOF

[75] Inventors: Akira Fukunishi, Shiga-ken; Yukio Zenitani, Nara-ken, both of Japan

[73] Assignee: Sanyo Chemical Industries, Ltd., Japan

[21] Appl. No.: 436,127

[22] Filed: May 8, 1995

[30] Foreign Application Priority Data

Jun. 2, 1994 [JP] Japan .................... 6-145459

[51] Int. Cl.$^6$ ........................................ B32B 7/00
[52] U.S. Cl. .................... 442/118; 428/481; 428/508; 428/509; 428/522; 428/523; 428/532
[58] Field of Search ........................ 428/245, 264, 428/265, 532, 481, 508, 509, 522, 523

[56] References Cited

U.S. PATENT DOCUMENTS

| | | | |
|---|---|---|---|
| 4,166,044 | 8/1979 | Germonprez et al. | 252/408 |
| 4,188,437 | 2/1980 | Rohowetz | 428/199 |
| 4,426,154 | 1/1984 | Yao | 526/240 |
| 4,471,079 | 9/1984 | Enami | 523/161 |
| 4,702,742 | 10/1987 | Iwata et al. | 8/495 |
| 4,849,770 | 7/1989 | Koike et al. | 346/1.1 |
| 4,877,680 | 10/1989 | Sakaki et al. | 428/332 |
| 5,328,504 | 7/1994 | Ohnishi | 106/20 D |

FOREIGN PATENT DOCUMENTS

| | | |
|---|---|---|
| 60-046290 | 3/1985 | Japan . |
| 5-148777 | 6/1993 | Japan . |
| 5-179577 | 7/1993 | Japan . |

*Primary Examiner*—Mark D. Sweet
*Attorney, Agent, or Firm*—Merchant, Gould, Smith, Edell, Welter & Schmidt

[57] ABSTRACT

The present invention relates to an interior base material suitable for a pigment ink printing process on which an organic-solvent-soluble synthetic resin (A) and a water insoluble-water absorbing resin having water absorption ability against pure water of 50 to 1,000 ml/g (B) are applied, the interior base material having a printed image with a pigment ink. The invention further relates to a method of printing an interior base material comprising the steps of, applying 0.01 to 50 weight percent with respect to the base material of each of an organic-solvent-soluble synthetic resin (A) and a water insoluble-water absorbing resin having water absorption ability to pure water of 50 to 1,000 ml/g (B), applying a pigment ink having viscosity of 5 to 10,000 cps by ink-jet printing or gravure printing, and drying.

This invention enables printing with excellent sharpness, uniformity to the deep part of the interior base material, and excellent build up.

11 Claims, No Drawings

INTERIOR BASE MATERIAL AND PRINTING METHOD THEREOF

BACKGROUND OF THE INVENTION

This invention relates to interior base materials suitable for a pigment ink printing process, interior base materials printed with a pigment printing ink which have fastness, that is, excellent waterproof, weatherproof and abrasion resistance property, and the methods of printing interior base materials. More specifically, the present invention relates to interior base materials which provide good printed images with sharpness to the inner part of the material by applying a pigment ink by such means as ink-jet printing or gravure printing, and the printing methods thereof.

DESCRIPTION OF THE PRIOR ART

Conventionally an interior base material is printed by previously applying a synthetic resin, namely to a cloth, a carpet base material or a paper, and subsequently printing a pigment ink thereon.

A pigment printing ink compound maintaining high viscosity has been commonly used at the time of printing an interior base material with a pigment printing ink in order to have a sharp printed image without blurring of the pigment ink. Although the method allows formation of a sharp pattern on a flat plane, when printing on a substrate having a slightly three-dimensional structure (having unevenness), the pigment ink cannot penetrate to the deep part of the substrate. Thus a valuable printing thoroughly penetrated from the surface to the deep part, that is, a printing having a pigment ink penetration effect, cannot be achieved. For example, if a pigment ink does not penetrate to the deep part of a carpet with a long pile, when the surface of the carpet is touched or pressed by hand, etc., a portion which is in the vicinity of the root of the pile which is not printed would be revealed, and such incomplete printing slashes the value of the printed merchandise.

In order to solve the problem, the inventors of the present invention have earnestly examined and have found out the method to enable the printing without suffering the above-mentioned problem, that is, to previously apply an organic-solvent-soluble synthetic resin (A) and a water insoluble water-absorbing resin (B) to the interior base material, and accomplished the present invention.

SUMMARY OF THE INVENTION

It is one object of the invention to provide an interior base material suitable for a pigment ink printing process which allows formation of a printed image with excellent sharpness, evenness and fastness penetrated to the deep parts of the material in terms of its thickness.

It is another object of the invention to provide a printed interior base material with a pigment ink with excellent sharpness, evenness and fastness thoroughly to the deep parts of the material in terms of its thickness.

It is a further specific object of the invention to provide an interior base material suitable for a pigment ink printing process which allows formation of a printed image penetrated to the deep part of the material in terms of its thickness with excellent sharpness, evenness and fastness by ink-jet printing or gravure printing.

It is another specific object of the invention to provide a interior base material printed with a pigment ink with excellent sharpness, evenness and fastness thoroughly to the deep parts of the material in terms of its thickness by the ink-jet method or gravure method.

It is a further object of the invention to provide a method to print an interior base material with a pigment ink which allows printing of the material to the deep part of the material in terms of its thickness to provide a printed image with excellent sharpness, evenness and fastness.

The present invention relates to an interior base material suitable for a pigment ink printing process on which an organic solvent-soluble synthetic resin (A) and a water-insoluble water absorbing resin having water absorption ability for pure water of 50 to 1,000 ml/g (B) are applied.

Further, the present invention relates to an interior base material on which an organic-solvent-soluble synthetic resin (A) and a water insoluble-water absorbing resin having water absorption ability for pure water of 50 to 1,000 ml/g (B) are applied and printed with a pigment ink.

Still further, the present inention relates to a method of printing an interior base material comprising the steps of applying 0.01 to 50 weight percent of each of an organic-solvent-soluble synthetic resin (A) and a water insoluble-water absorbing resin having water absorption ability for pure water of 50 to 1,000 ml/g (B), applying a pigment ink having viscosity of 5 to 10,000 cps by the ink-jet printing or the gravure printing to the interior base material, and drying.

DESCRIPTION OF THE PREFERRED EMBODIMENT

As the organic-solvent-soluble synthetic resins (A) in the present invention, resins disclosed in item 101 to item 317 in the "Chemistry of Synthetic Resins", second revised edition published on Nov. 15, 1968 by Gihodo Corp. can be used.

Concrete examples of such synthetic resins (A) include polymerization resins (I), condensation resins (II) and semi-synthetic polymers (III). Resins soluble in an organic solvent of either kind of the above-mentioned synthetic resins can be included.

Examples of unsaturated polymerization resins among the polymerization resins (I) include hydrocarbon resins such as polyethylene resin, ethylene copolymers (such as ethylene-vinyl acetate copolyer and ethylene-acrylic acid copolymer), polypropylene resin, ethylene propylene rubber and polybutene; acrylic acid resins such as acryl resin and acryl rubber, methacryl resin, polyacryl amide and polyacrylic acid salt; vinyl acetate resins and vinyl alcohol resins such as vinyl acetate resin, polyvinyl alcohol resin, formal resin and butyral resin; halogen possessing resins such as vinyl chloride resin and vinylidene chloride resin; and diene polymers such as butadiene synthetic rubber, chloroprene synthetic rubber and isoprene synthetic rubber.

Examples of addition condensation resins of the condensation resins (II) include phenol resins such as phenol-formaldehyde resin, cresol-formaldehyde resin and resorcin resin; amino resins such as melamine resin and guanamine resin; and xylene resin.

Examples of polycondensation resins of the condensation resins (II) include polyester resins such as saturated alkyd resin, unsaturated polyester resin, allyl resin and polycarbonate; polyamide resins such as 6-nylon, 66-nylon, polyimide and polyamide of polymerized fatty acid; and silicon resins or furan resins.

Examples of polyaddition resins of the condensation resins (II) include polyurethane resin, polyurea resin and epoxy resin (a resin obtained by the curing reaction of a glycidyl epoxide and a curing agent under the presence of a diluent).

Examples of semisynthetic polymers (III) include cellulose resins (such as cellulose acetate), cellulose ethers, (such as cellulose methyl, carboxymethyl cellulose (CMC), hydroxy ethyl cellulose (HEC)), natural rubber resins (such as chlorinated rubber, cyclized rubber) and protein resins (such as casein plastic).

Among these examples, preferable resins are ethylene copolymers, acrylic resins, butyral resins, polyester resins and polyurethane resins. These resins are generally used in a state of powders, solution or emulsion according to the characteristics of the resin. In general, powders are heated and melted. A solution is prepared by dissolving with a solvent (such as toluene, xylene, ethyl acetate, acetone, methyl ethyl ketone, cellosolve, carbitol) when used. An emulsion is prepared by emulsification with an emulsifier. In the present invention, it is preferable to use a solution obtained by dissolving a synthetic resin with an organic solvent. An emulsion synthetic resin is an emulsified and dispersed synthetic resin. An example of the water-insoluble water-absorbing resins used in the present invention is ① a resin obtainable by polymerizing starch or cellulose (a), a monomer chosen from the group consisting of a water-soluble monomer having a carboxyl group or a sulfonic acid group or a monomer capable of becoming water-soluble by hydrolysis (hereinafter, designated as a water-soluble monomer) (b) and a crosslinking agent (c) as the essential components and subsequently carrying out, if necessary, hydrolysis (hereinafter, designated as a starch or cellulose series crosslinking material).

Details of the components (a), (b) and (c) used in producing the water insoluble-water absorbing resins mentioned above and the proportions of the components (a), (b) and (c), production methods and specific examples of the water insoluble-water absorbing resins are disclosed in the Japanese Patent Application Laid Open No. 25886/1977 and the Japanese Patent Publication No. 46199/1978, No. 46200/1978 and No. 21041/1980.

Examples of (a) include raw starches such as sweet potato starch, potato starch, wheat starch, corn starch, rice starch, and tapioca starch; processed starches such as oxidized starch, dialdehyde starch, alkyl etherized starch, oxyalkylated starch, amino ethyl etherized starch, and cyano ethyl-etherized starch; and celluloses such as natural cellulose, carboxymethyl cellulose, and cellulose ether.

Examples of (b) include monomers possessing a carboxyl group such as (meth)acrylic acid and maleic anhydride; monomers possessing a carboxylate group such as sodium (meth)acrylate, sodium maleate, trimethylamine salt of (meth)acrylic acid and trimethanolamine salt of (meth) acrylic acid; monomers possessing a sulfonic acid group such as vinyl sulfonic acid, vinyl toluene sulfonic acid and sulfopropyl (meth)acrylate; and monomers possessing a sulfonate group such as sodium vinyl sulfonate, methyl amine salt of vinyl sulfonic acid, and sulfopropyl diethanol amine salt of (meth)acrylic acid.

Examples of (c) include polyols such as ethylene glycol, trimethylol propane; bisacrylamides such as N,N-methylenebisacrylamide; multifunctional (meth)acrylic esters such as ethylene glycol di(meth)acrylate, polyethylene glycol di(meth)acrylate, trimethylol propane tri(meth) acrylate; methylol (meth)acrylamide, and glioxal.

In the description herein, "(meth)acrylic-" denotes "acrylic-" or "methacrylic-".

Other examples of the water-insoluble water-absorbing resins include ② resins obtained by polymerizing the components (a) and (b), such as hydrolyzed products of starch-acrylonitrile graft polymer or hydrolyzed products of cellulose-acrylonitrile graft polymer (hereinafter, ② is designated as a starch- or cellulose-acrylonitrile graft polymer); ③ crosslinked material of (a) such as crosslinked carboxy methyl cellulose; ④ a copolymer of the components (b) and (c) such as partially hydrolyzed product of crosslinked polyacrylamide, crosslinked acrylic acid-acrylamide copolymer, crosslinked sulfonated polystyrene, saponified vinylester-unsaturated carboxylic acid copolymer disclosed in the Japanese Patent Application Laid Open No. 14689/1977 and No. 27455/1977, crosslinked polyacrylic acid or salts thereof, crosslinked acrylic acid-acrylic ester copolymer, crosslinked isobutylene-maleic acid anhydride copolymer and crosslinked carboxylic acid denaturated polyvinyl alcohol; and ⑤ self-crosslinking polymerization products of the component (b) such as self-crosslinkable polyacrylic acid salts. These water-insoluble water-absorbing resins may be used alone or in combinations of two or more.

Among the above examples, water-insoluble water-absorbing resins of ① and some of ④ such as the partially hydrolyzed product of crosslinked polyacrylamide, crosslinked acrylic acid-acrylamide copolymer, crosslinked polyacrylic acid salts such as the alkali metal and ammonium salts, crosslinked acrylic acid-acrylic acid ester copolymer, crosslinked isobutylene-maleic acid anhydride copolymer and crosslinked carboxylic acid denaturated polyvinyl alcohol, are preferable.

The above mentioned preferable water insoluble-water absorbing resins have a water absorption ability for pure water of 50 to 1,000 ml/g, preferably 300 to 1,000 ml/g. The preferable state of the water-insoluble water-absorbing resin is powdery, especially fine powder having particle size of 0.1 to 100 μm are preferable.

The amount of the organic solvent-soluble synthetic resin (A) and water-insoluble water-absorbing resin (B) to apply to the interior base material is, in general, 0.01 to 50 weight percent respectively, more preferably, 0.1 to 30 weight percent respectively based on the weight of the interior base material. If the amount is less than 0.01 weight percent, the property to prevent ink blurring or to print the material to the deep part (penetration effect) tends to deteriorate, and besides, the amount is insufficient to evenly print the surface of the interior base material with a pigment printing ink. If the ratio exceeds 50 weight percent, the feeling of the interior base material tends to become undesirably hard.

The weight ratio of an organic solvent soluble synthetic resin (A) and a water-insoluble water-absorbing resin (B) is in general, from (1:9) to (7:3), preferably from (2:8) to (6:4). If the amount of (A) is less than 1 part by weight, or the amount of (B) exceeds 9 parts by weight, (B) tends to easily come off and hardly fix to the material. Namely, the wearing resistance property of a formed printed image tends to deteriorate. If the amount of (A) exceeds 7 parts by weight, or the amount of (B) is less than 3 parts by weight, effects to prevent ink blurring or to penetrate the ink tend to be insufficient.

Pigment inks used in the present invention include water-based pigment inks using an inorganic pigment or an organic pigment. In a water-based pigment ink, water is a medium and the pigment is dispersed or emulsified therein. The primary constituents of a water-based pigment ink are pigment/vehicle/surfactant/water, with the weight ratio of 25-40/20-35/2-8/28-42.

Inorganic pigments can be white pigment, extender pigment, black pigment, grey pigment, red pigment, brown pigment, yellow pigment, green pigment, blue pigment, purple pigment, and more concretely, the pigments disclosed in the items 76 to 147 in the "Pigments and Paints" published by Kyoritu Shuppan Co. on Jun. 10, 1972 according to the hue classification.

Organic pigments can be, natural organic pigment (such as cochineal lake, madder lake), synthetic organic pigment (such as nitroso pigment, nitro pigment, azo pigment), and more concretely, the pigments disclosed in the items 150 to 186 in the above-mentioned publication according to the chemical structure classification.

As the vehicle, solvents (such as propanol, ethylene glycol, and glycerol) can be used, and if necessary, plasticizers (such as dioctyl phosphate and tricresyl phosphate), waxes (such as polyethylene glycol and montan wax), resins (starch, dextrin, glue, casein, gum arabic, polyvinyl alcohol, methyl cellulose derivative, water-soluble rubber, denatured maleic acid resin, acrylic resin emulsion, and phenol resin), antioxidant, antimold agents, and disinfectant are added thereto. In this invention, water-based pigment printing inks are preferable. Concrete examples can be found in the items 24–38, 74–125, 195–216 in the "Printing Ink Technology" published by CMC Co.

As the interior base materials in the present invention, a woven or knitted fabric; a non-woven fabric; carpet base materials such as woven carpet, knitted carpet, tufted carpet, stitched-on-pile-carpet, bonded-pile-carpet, hooked carpet, and knotted-pile-carpet; and papers such as machine-made paper and Japanese paper can be used.

As fiber materials for such fabrics or carpet base materials, any fiber materials including optional synthetic fibers (such as polyester, polyamide, and acrylic fiber), semisynthetic fibers (such as acetate and rayon), natural fibers (such as cotton, silk, and wool), and mixture thereof (such as blended woven fabric, twisted union fabric, and knit/textile union fabric) can be used.

Examples of the interior materials produced from interior base materials of this invention include ceiling material, wall material, floor material (including carpet), mural decoration, curtain, blind, lamp shade, book cover, and furniture.

When an organic solvent solution of a synthetic resin (A) is used in applying the synthetic resin (A) in the present invention to the interior base material, the applicable solvents include alcohols having from 1 to 8 carbon atoms such as methanol and isopropanol; ketones having from 2 to 6 carbon atoms such as acetone and methyl ethyl ketone; esters having from 3 to 5 carbon atoms such as ethyl acetate; polyhydric alcohols having from 4 to 10 carbon atoms such as ethylene glycol, diethylene glycol, propylene glycol, and glycerol; ether compounds having from 4 to 10 carbon atoms such as methyl cellosolve, ethyl cellosolve, and methyl carbitol; formamide derivatives having from 1 to 9 carbon atoms such as N-cyclohexyl formamide, N-,N-dibutyl formamide, and N-,N-dimethyl formamide; and hydrocarbon solvents having from 6 to 8 carbon atoms such as toluene, xylene, and n-hexane. In general, the solvent solution concentration of a synthetic resin (A) is preferably from 1 to 50 weight percent. In the application to an interior base material, the interior base material is treated with a solvent solution of a synthetic resin (A) by any of the padding method, spray method, coating method, or printing method, followed by a drying operation. Among those methods, the spray method and coating method are preferable.

If an organic solvent soluble synthetic resin (A) in the emulsion state is used, it can be used as it is or after being diluted with water, that is, water diluted solution of the emulsion of 1 to 50 weight percent concentration is prepared and applied in the similar way as a solvent solution of the synthetic resin (A).

Methods to apply the water-insoluble water-absorbing resins (B) to an interior base material will be illustrated. Particles of a water insoluble-water absorbing resin (B) are dispersed in a solvent (such as the same solvents used in applying a synthetic resin (A) to an interior base material) to prepare a dispersion. In this case, the water insoluble-water absorbing resin (B) would not be dissolved in the solvent used. In general, the concentration of the dispersed particles of a water-insoluble water absorbing resin (B) in the dispersion liquid is 1 to 50 weight percent. The interior base material is treated with the dispersion by any of the padding method, spray method, coating method and printing method, and followed by a drying operation. Among these methods, the spray method is preferable. If a drier with an anti-explosive device is used, alcohol solvents of from 1 to 4 carbon atoms such as methanol and isopropanol, or hydrocarbon solvents of from 6 to 8 carbon atoms such as toluene, xylene which easily evaporate can be used preferably. If a drier without an anti-explosive device is used, polyhydric alcohols of from 2 to 10 carbon atoms such as ethylene glycol can be used preferably.

In the present invention, an organic solvent soluble synthetic resin (A) and a water insoluble-water absorbing resin (B) can be applied to the interior base material in the following three methods.

1) The method of initially treating with a synthetic resin (A) followed by treating with a water insoluble-water absorbing resin (B) thereon.

2) The method of initially treating with a water-insoluble water absorbing resin (B) followed by treating with a synthetic resin (A) thereon.

3) The method of preliminary mixing a synthetic resin (A) and a water insoluble-water absorbing resin (B) and treating with the mixture.

In consideration of practicality and the performance of the operation such as anti-blurring effect of the ink, penetration effect of the ink, and abrasion resistance property of a water insoluble-water absorbing resin, the method 3) is preferable.

A preferable concrete example of the printing method of pigment inks in this invention comprises, initially applying a solvent solution of a synthetic resin (A) and a solvent dispersion of a water insoluble-water absorbing resin (B) to an interior base material, and drying to have a interior base material for a pigment ink printing of the present invention. Then the interior base material for a pigment ink printing is printed with a pigment ink by an ink-jet dyer or gravure printer, followed by a drying operation, and optionally by a finishing treatment such as water-repellent processing, soil-repellent processing, inflammable processing or antimold processing.

Printing methods used in the present invention include letterpress printing, planographic printing, intaglio printing and stencil printing. Examples of printing methods are disclosed in detail in the "Printing Guide—Knowledge and Technology to Order Printing" published by Seibundoshinkosha on Oct. 10, 1971.

1) The letterpress printing uses the plate having printing parts to be coated with printing ink which are elevated with respect to nonprinting parts not to be coated with a printing ink. Letterpress printing with types, stereotype printing to print newspapers, zinc etching or copper plate by photoengraving technology are all included as this printing method.

(A "printing part" herein denotes a part of a plate to which a printing ink is applied and a "nonprinting part" denotes a part of a plate to which a printing ink is not applied.)

2) The planograph printing is the technology to apply chemical treatment to a flat plane to form printing parts and nonprinting parts. This printing method is becoming more and more important with a metal plate replacing a stone plate, and the development of the method of printing a metal flat plate named offset enabled by the progress of the photograving technology.

3) The intaglio printing is the method to form a dent on the surface of a metal plane to be filled with a printing ink for printing a subject to be printed. Namely, this is a printing method to use a plate having printing parts indented with respect to the plane of nonprinting parts. This method has been developed from the engraving intaglio printing such as etching and now is used as gravure printing primarily for the printing of photoengraving.

4) The stencil printing uses the plate of a paper or cloth forming nonprinting parts by preventing penetration of ink at the surface of the material and having printing parts to allow the penetration of the ink. The method includes mimeograph printing and screen printing.

These printing methods can be optionally used in this invention.

The ink jet printing method employed in this invention may be achieved by discharging the printing ink effectively from the nozzle, and applying the ink on the interior base material which is the object of the ink-jet printing. Typical examples are disclosed, for example, in I.E.E.E. Transactions on Industry Applications, Vol. 1A-13, No. 1; and Nikkei Electronics, Apr. 19, 1976 and Feb. 3, 1977.

Typical examples include the following methods (1) to (3).

(1) The electrostatic attraction system: a method which applies a ferroelectric field between a nozzle and an accelerating electrode disposed several millimeters apart and draws granulate ink out of the nozzle continuously; then when the drawn ink particles flow between deflecting electrodes, an information signal is given to the deflecting electrodes to be recorded.

(2) The ultrasonic vibration system: a method to apply high pressure to the ink by means of a small pump, with the nozzle vibrated mechanically by a quartz oscillator to jet out small ink particles and at that moment the jetted ink particles are electrically charged depending on the information signal, to be deflected depending on the amount of charge when passing through deflecting electrode plates.

(3) The piezoresistive element system: a method to utilize piezoresistive elements, that is, to provide the piezoresistive elements with electric signals to cause mechanical displacement, and apply pressure to jet out ink from the nozzle.

These various ink-jet systems are known arts and these systems can be applied to the invention optionally.

Since the ink-jet printing and the gravure printing (a kind of intaglio printing) can illustrate the characteristics of the printing method of the present invention, they are preferable.

Although the present invention will be further described referring to Examples, the present invention is not limited to them. Hereinafter "percent" refers to weight percent, refers to weight part respectively, and performance is evaluated as follows.

1. Sharpness examination;

Geometrical patterns were printed by the ink-jet printing or the gravure printing to evaluate the sharpness with the naked eye. The printed geometrical patterns were a solid isosceles triangle having angles of 20°, 80°, 80° and a base 3 cm in length, and a square with sides 3 cm in length having a slit of 1 mm width at the center thereof.

(Criteria of the evaluation)

⊚: Printed without any blurring, having sharp fine lines of the patterns.

○: Printed without blurring, having sharp fine lines of the patterns.

△: Printed with slight blurring, having unclear fine lines of the patterns.

×: Printed with blurring, having fine lines of patterns not expressed at all.

2. Saturation examination;

The solid printing was conducted by the ink-jet printing or the gravure printing and the drying operation followed, then the lightness (L value) was measured at 5 points on the printed surface, namely at the center and at 4 points of the corners with the spectrophotometer "Multi Spectro MSC-2" manufactured by Suga Shikenki Co., Ltd. With the L value at the center as the standard, the color differences (ΔE) between the standard and the value at the 4 points at the corners were calculated. A smaller value of a color difference (ΔE) means the point has a similar lightness to the central point, and thus the printing is conducted successfully without unevenness, having the pigment ink penetrated well.

3. Build up examination;

The average value of the lightness (L value) of the printed object in the item 2. measured at 5 points was calculated. A smaller value represents a good build up. The build up refers to the quantity rate of pigment-deposition in the printing process; that is, a degree of pigment exhaustion.

EXAMPLE 1

To a rayon non-woven fabric of 80 g weight per square meter, 40 g per square meter, namely, 50% with respect to the base material based on solid contents of the below-mentioned composition was applied with a doctor knife followed by the drying operation at 80° C. for 5 minutes to obtain an interior base material for pigment ink printing of the present invention.

| | |
|---|---|
| "Sumitate MB-11" (*1) | 20 (parts) |
| "SANWET IM-1000SP" (*2) | 30 |
| toluene | 50 |
| Total | 100 |

*1 . . . copolymer of ethylene-vinyl acetate resin manufactured by Sumitomo Chemical Company, Ltd.
*2 . . . starch series crosslinked-type water insoluble-water absorbing resin manufactured by Sanyo Chemical Industries, Ltd.

The above-mentioned substrate was printed by the ink-jet printing under the following conditions.

| (Composition of the ink for ink-jet process) | |
|---|---|
| Phthalocyanine Blue | 20 (parts) |
| ethanol | 5 |
| stylene · acrylic acid · ethyl methacrylate copolymer | 6 |
| monoethanol amine | 1 |
| ion exchange water | 62 |
| diethylene glycol | 6 |
| Total | 100 |

-continued

| (Property of the ink) | |
|---|---|
| viscosity (cps/25° C.) | 20 |
| surface tension (dyne/cm, 25° C.) | 50.5 |
| PH | 8 |
| (Ink-jet printing) | |
| (1) Printing | |
| 1) Ink-jet process | ink on demand system |
| 2) Nozzle diameter | 60 μm |
| 3) Voltage applied | 50 V |
| (2) Drying | at 80° C., for 5 minutes |

EXAMPLE 2

The ethylene•vinyl acetate resin of the Example 1 was replaced with an acryl resin, "SX-310F" manufactured by Negami Kogyo Co., Ltd. as 30% solid solution of toluene. An interior base fabric of the present invention was produced with the composition of 70 parts of "SX-310F" solution and 30 parts of "IM-10008P" (with the acryl resin representing 21 parts and toluene 49 parts in this composition). Ink-jet printing was conducted in the same way as in Example 1.

EXAMPLE 3

The ethylene•vinyl acetate resin of the Example 1 was replaced with a polyurethane resin, "Samplene SP-75" manufactured by Sanyo Chemical Industries, Ltd. and an interior base material for pigment ink printing of the present invention was produced. Ink-jet printing was conducted in the same way as in Example 1.

COMPARATIVE EXAMPLE 1

Without using the water insoluble-water absorbing resin in the Example 1, namely only with the ethylene•vinyl acetate resin, an interior base material for pigment ink printing was produced in the same way as the Example 1. Further, ink-jet printing was conducted in the same way as in Example 1.

The interior base materials of the Examples 1–3 and the Comparative Example 1 were evaluated in terms of sharpness, penetration (uniform printing), and build up, and the results are described in Table 1.

TABLE 1

| | Sharp-ness | Penetration (even printing) | | | | Build up (L value) |
|---|---|---|---|---|---|---|
| | | L–U | R–U | L–D | R–D | |
| Example 1 | ⊙ | 0.3 | 0.2 | 0.4 | 0.3 | 24.3 |
| Example 2 | ⊙ | 0.4 | 0.3 | 0.3 | 0.2 | 25.6 |
| Example 3 | ⊙ | 0.2 | 0.3 | 0.4 | 0.3 | 23.2 |
| Comparative Example 1 | x | 1.1 | 1.2 | 0.8 | 0.8 | 38.9 |

*In the Table 1, L–U, R–U, L–D, R–D denote the following positions, left-up, right-up, left-down, right-down, respectively.

The evaluation results described in the Table 1 illustrate good performance for the objects printed by the ink-jet printing of the present invention, that is, excellent sharpness and uniform penetration of the ink to the deep parts of the base material. They also displayed excellent build up.

EXAMPLE 4

To a non-woven fabric with blending ratio of 65% polyester and 35% rayon of 100 g weight per square meter, 30 g per square meter, namely, 30% with respect to the base material based on solid contents of the below-mentioned composition was applied with a doctor knife followed by the drying operation at 60° C. for 3 minutes to obtain an interior base material for pigment ink printing of the present invention.

| | |
|---|---|
| "Denka butyral #3000K" (*3) | 30 (parts) |
| "SANWET IM-5000MPS" (*4) | 30 |
| isopropanol | 40 |
| Total | 100 |

*3 ... butyral resin manufactured by Denki Kagaku Kogyo Kabushiki Kaisha.
*4 ... crosslinking polyacrylic type water absorbing resin manufactured by Sanyo Chemical Industries, Ltd.

The above-mentioned substrate was gravure printed under the following conditions.

| (Composition of the acrylic water gravure ink) | |
|---|---|
| naphthol red (C.I. pigment red 17) | 15 (parts) |
| acryl resin (acid value: 160, thermal softening point: 110° C.) | 7 |
| 28% aqueous ammonia | 1.4 |
| ethyl alchol | 4 |
| antifoaming agent (tributyl phosphate) | 0.5 |
| ion exchange water | remainder |
| Total | 100 |
| (Property of the ink) | |
| viscosity (cps/25° C.) | 100 |
| pH | 9 |
| (Gravure printing) | |
| (1) Printing | |
| Printing is conducted with the gravure printing tester manufactured by Toshiba Machine Co., Ltd. | |
| (2) Drying | at 80° C., for 5 minutes |

EXAMPLE 5

The butyral resin of the Example 4 was replaced with a polyester resin, "Vylon 200" manufactured by Toyobo Co., Ltd. and an interior base material for pigment ink printing of the present invention was formed. Gravure printing was conducted in the same way as in Example 4.

EXAMPLE 6

The butyral resin of the Example 4 was replaced with a vinyl chloride.vinyl acetate copolymer resin, "Vinychlon 100LG" manufactured by Mitsui Toatsu Chemicals, Inc. and an interior base material for pigment ink printing of the present invention was formed. Gravure printing was conducted in the same way as in Example 4.

COMPARATIVE EXAMPLE 2

Without using the water insoluble-water absorbing resin in the Example 4, namely only with butyral resin, an interior base material for pigment ink printing was formed in the same way as the Example 4. Further, gravure printing was conducted in the same way as in Example 4.

The interior base materials of the Examples 4–6 and the Comparative Example 2 were evaluated in terms of sharpness, penetration (uniform printing), and build up, and the results are described in Table 2.

TABLE 2

|  | Sharp-ness | Penetration (even printing) | | | | Build up |
| --- | --- | --- | --- | --- | --- | --- |
|  |  | L–U | R–U | L–D | R–D | (L value) |
| Example 4 | ◉ | 0.2 | 0.2 | 0.3 | 0.2 | 16.8 |
| Example 5 | ◉ | 0.1 | 0.2 | 0.1 | 0.3 | 17.9 |
| Example 6 | ◉ | 0.3 | 0.2 | 0.2 | 0.3 | 18.7 |
| Comparative Example 2 | x–Δ | 1.5 | 1.2 | 0.8 | 0.9 | 29.6 |

*In the Table 1, L–U, R–U, L–D, R–D denote the following positions, left-up, right-up, left-down, right-down, respectively.

The evaluation results described in the Table 2 illustrate good performance for the objects printed by the gravure printing of the present invention, that is, excellent sharpness and uniform penetration of the ink to the deep parts of the base material. They also displayed excellent build up.

The materials printed by the ink-jet printing or by the gravure printing of the present invention have printed images of excellent sharpness, thorough penetration of the ink to the deep parts of the base material, uniform printing and good build up.

Similar effects can be expected with a dyestuff ink as well as a pigment ink.

We claim:

1. An interior base material suitable for a pigment ink printing process, which comprises an interior base material selected from the group consisting of ceiling materials, wall materials, floor materials, mural decorations, curtains, blinds, lampshades and furniture, to which has been applied, before printing, an organic solvent-soluble synthetic resin (A) and a water-insoluble water-absorbing resin having a water absorption ability for pure water of 50 to 1,000 ml/g (B), said resin (A) having been applied to the material in the form of a solution in an organic solvent.

2. The interior base material suitable for pigment ink printing according to claim 1, wherein the organic solvent-soluble synthetic resin (A) comprises at least one selected from the group consisting of ethylene copolymers, acrylic resins, butyral resins, polyester resins and polyurethane resins.

3. The interior base material suitable for pigment ink printing according to claim 1, wherein the particle size of the water-insoluble water-absorbing resin (B) is in the range of 0.1 to 100 μm.

4. The interior base material suitable for pigment ink printing according to claim 1, wherein the amount of each of the organic solvent-soluble synthetic resin (A) and the water insoluble water-absorbing resin (B) applied to the interior base material is in the range of 0.01 to 50 weight percent of the base material.

5. The interior base material suitable for pigment ink printing according to claim 1, wherein the weight ratio of the organic solvent-soluble synthetic resin (A) and the water-insoluble water-absorbing resin (B) is in the range of from (1:9) to (7:3).

6. A printed interior base material which comprises an interior base material, to which has been applied an organic solvent-soluble resin (A) in the form of a solution in an organic solvent and a water-insoluble water-absorbing resin having a water absorption ability for pure water of 50 to 1,000 ml/g (B) and which has been post-printed with a pigment ink.

7. The interior base material according to claim 6, wherein the organic solvent-soluble synthetic resin (A) comprises at least one selected from the group consisting of ethylene copolymers, acrylic resins, butyral resins, polyester resins and polyurethane resins.

8. A printed interior base material which comprises an interior base material, to which has been applied an organic solvent-soluble synthetic resin (A) and a water-insoluble water-absorbing resin having a water absorption ability for pure water of 50 to 1,000 ml/g (B) and which has been post-printed with a pigment ink, wherein the particle size of the water-insoluble water-absorbing resin (B) is in the range of 0.1 to 100 μm.

9. A printed interior base material which comprises an interior base material, to which has been applied an organic solvent-soluble synthetic resin (A) and a water-insoluble water-absorbing resin having a water absorption ability for pure water of 50 to 1,000 ml/g (B) and which has been post-printed with a pigment ink, wherein the amount of each of the organic solvent-soluble synthetic resin (A) and the water-insoluble water-absorbing resin (B) is in the range of 0.01 to 50 weight percent of the base material.

10. The interior base material according to claim 6, wherein the weight ratio of the organic solvent-soluble synthetic resin (A) and the water-insoluble water-absorbing resin (B) is in the range of from (1:9) to (7:3).

11. The interior base material according to claim 6, wherein the base material is selected from the group consisting of ceiling materials, wall materials, floor materials, mural decorations, curtains, blinds, lampshades and furniture.

* * * * *